United States Patent
Tan et al.

(10) Patent No.: US 7,386,643 B2
(45) Date of Patent: *Jun. 10, 2008

(54) MECHANISM TO GUARANTEE FORWARD PROGRESS FOR INCOMING COHERENT INPUT/OUTPUT (I/O) TRANSACTIONS FOR CACHING I/O AGENT ON ADDRESS CONFLICT WITH PROCESSOR TRANSACTIONS

(76) Inventors: Sin S. Tan, 15706 NW. Andalusian Way, Portland, OR (US) 97229; Stanley S. Kulick, 20385 NW. Quail Hollow Dr., Portland, OR (US) 97229; Rajesh S. Pamujula, 1396 NE. Alex Way, #272, Hillsboro, OR (US) 97124

( * ) Notice: Subject to any disclaimer, the term of this patent is extended or adjusted under 35 U.S.C. 154(b) by 546 days.

This patent is subject to a terminal disclaimer.

(21) Appl. No.: 10/970,015

(22) Filed: Oct. 21, 2004

(65) Prior Publication Data
US 2005/0060502 A1    Mar. 17, 2005

Related U.S. Application Data

(63) Continuation of application No. 10/324,863, filed on Dec. 19, 2002, now Pat. No. 6,832,268.

(51) Int. Cl.
  *G06F 3/00* (2006.01)
  *G06F 9/26* (2006.01)
  *G06F 9/30* (2006.01)
(52) U.S. Cl. .................... 710/36; 710/3; 711/200; 711/210; 712/216
(58) Field of Classification Search .............. None
See application file for complete search history.

(56) References Cited

U.S. PATENT DOCUMENTS

| | | | | |
|---|---|---|---|---|
| 4,574,350 | A | 3/1986 | Starr | 710/200 |
| 5,613,139 | A | 3/1997 | Brady | 710/200 |
| 5,895,494 | A | 4/1999 | Scalzi et al. | 711/150 |
| 5,905,998 | A * | 5/1999 | Ebrahim et al. | 711/144 |
| 6,108,739 | A | 8/2000 | James et al. | 710/113 |
| 6,173,351 | B1 | 1/2001 | Garnett et al. | 710/309 |
| 6,487,643 | B1 | 11/2002 | Khare et al. | 711/150 |
| 6,516,393 | B1 * | 2/2003 | Fee et al. | 711/150 |
| 6,622,217 | B2 * | 9/2003 | Gharachorloo et al. | 711/141 |

* cited by examiner

*Primary Examiner*—Alan S. Chen
(74) *Attorney, Agent, or Firm*—Blakely, Sokoloff, Taylor & Zafman LLP

(57) ABSTRACT

A forwarding device compares a first address from a first coherent input/output (I/O) transaction with an address from at least one processor-issued transaction to determine if an address conflict exists. The forwarding device completes a first processor-issued transaction of the at least one processor-issued transaction if the address conflict exists and rejects the first coherent I/O transaction. The forwarding device holds remaining processor transactions of the at least one processor-issued transaction that have an address conflict with the first address of the first coherent I/O transaction. The forwarding device transmits the first coherent I/O transaction to an external I/O device, waits for the first coherent I/O transaction to return from the external I/O device, and completes the first coherent I/O transaction. The forwarding device releases the remaining processor transactions once the first coherent I/O transaction has been completed.

20 Claims, 3 Drawing Sheets

MECHANISM TO GUARANTEE FORWARD PROGRESS FOR INCOMING COHERENT INPUT/OUTPUT (I/O) TRANSACTIONS FOR CACHING I/O AGENT ON ADDRESS CONFLICT WITH PROCESSOR TRANSACTIONS

RELATED APPLICATIONS

This application is a continuation of application Ser. No. 10/324,863, filed Dec. 19, 2002, now U.S. Pat. No. 6,832,268.

BACKGROUND

1. Technical Field

Embodiments of this invention relate generally to preventing starvation problems for incoming coherent Input/Output (I/O) transactions, and more specifically, to preventing starvation for incoming coherent I/O transactions against coherent processor-issued transactions when both transactions are attempting to access the same memory address.

2. Discussion of the Related Art

Coherent transactions may attempt to access a physical memory space. Coherent transactions access the physical memory space by requesting a read or write command to a specific memory address. A subset of coherent transactions, such as processor-issued transactions may be incoming that request the use of a specific memory address. Additionally, input/output (I/O) device issued coherent transactions may request the use of a specific memory address. For simplicity, the I/O device issued coherent transactions may be referred to as coherent I/O issued transactions. If the processor issued transactions request the same specific memory address as the coherent I/O issued transactions, a conflict arises. When the conflict arises, the coherent I/O issued transaction with the memory address conflict will not progress to its destination because of the address conflict. This conflict may occur while other non-conflicted coherent I/O transactions and all other processor-issued transactions progress to their destination.

DETAILED DESCRIPTION

Figure 1:
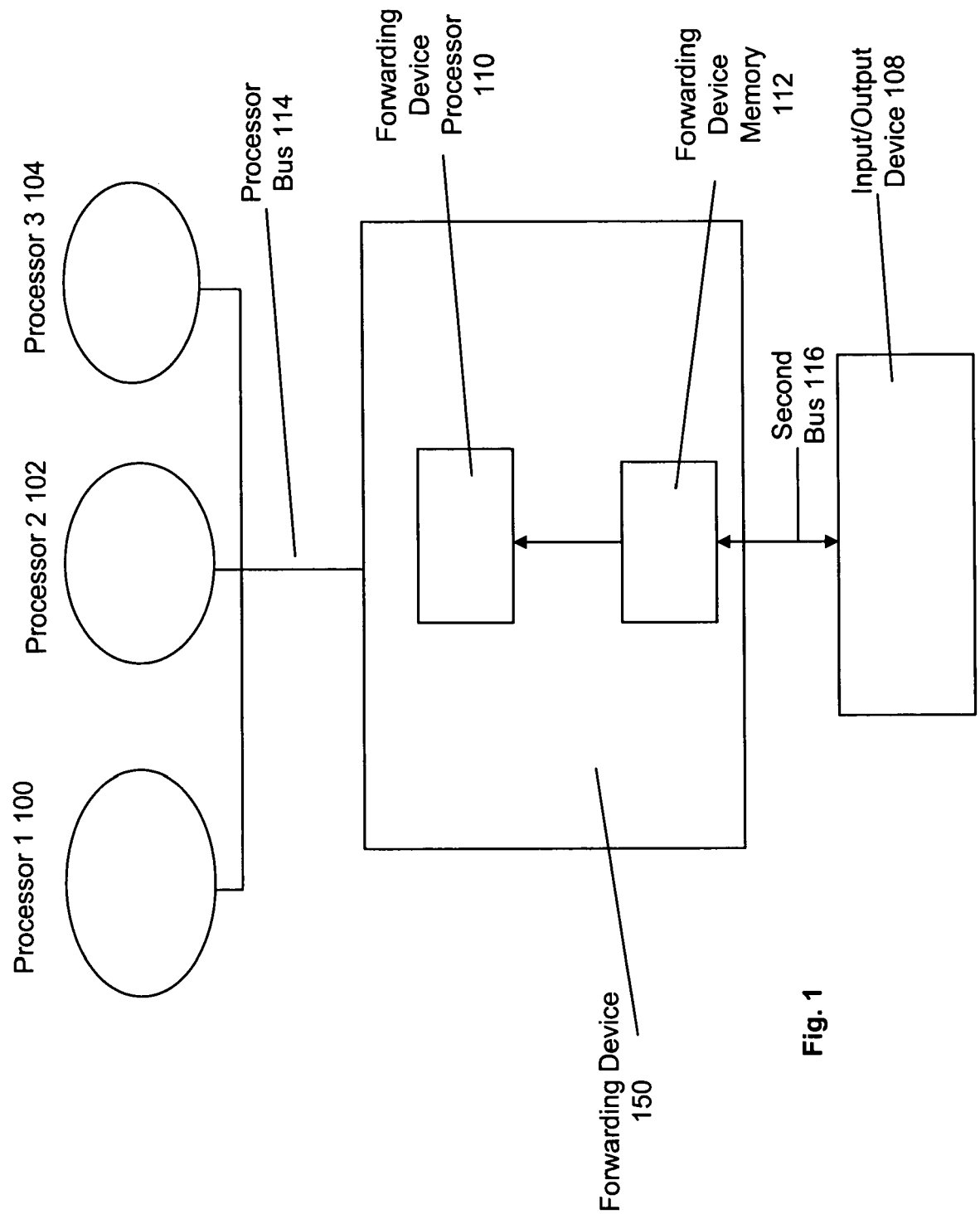
FIG. 1 illustrates a multi-node computing device according to an embodiment of the present invention.

FIG. 1 illustrates a multi-node computing device according to an embodiment of the present invention. A multi-node computing device may include at least one processor 100 102 104, at least one forwarding device 150, and at least one input/output (I/O) device 108. The multi-node computing device may also include a switching device (not shown). For simplicity only one forwarding device 150 is discussed. The forwarding device 150 may include a forwarding device memory 112 and a forwarding device processor 110. The at least one processor 100 102 104 may be coupled to one of the forwarding device 150 via a processor bus 114. In the embodiment where the at least one processor 100 102 104 is coupled to the at least one forwarding device 150 via a processor bus 114, the forwarding device 150 may be located in a scalability device (not shown). In embodiments of the invention, the at least one scalability device may also be referred as a North Bridge. In an alternative embodiment of the present invention, the at least one forwarding device 150 may be located in between the at least one scalability device 106 and the at least one I/O device 108, i.e., in the switching device. In this embodiment, the at least one forwarding device 150 may be connected to the at least one I/O device 108 through a second bus 116. Alternatively, the forwarding device 150 may be located in the I/O device 108. In Intel™ multi-node computing systems, for example, the scalability device may be a scalable node controller, the switching device may be a scalability port switch, and the I/O device may be a server input/output hub (SIOH).

The forwarding device 150 may receive a plurality of processor-issued transactions and a first coherent input/output (I/O) transaction. The at least one forwarding device 150 may compare a first memory address that the first coherent I/O transaction is trying to access against at least one memory address that the at least one processor-issued transaction is attempting to access. If the at least one forwarding device 150 determines that a memory address conflict exists between the first coherent I/O transaction and one of the at least one processor-issued transactions, the at least one forwarding device 150 may complete the first processor-issued transaction that has the memory address conflict with the first coherent I/O transaction. The forwarding device 150 may complete the one processor-issued transaction by instructing the forwarding device processor 110 to process the one processor-issued transaction and allow the first processor-issued transaction to access the address of the plurality of memory addresses; in the forwarding device memory 112.

The forwarding device 150 may reject the first coherent I/O transaction and transmit the first coherent I/O transaction to the second bus 116. The forwarding device 150 may hold remaining processor-issued transactions attempting to access the same address, i.e., the first address in the forwarding device memory 112 that the first coherent I/O transaction was attempting to address. After the first coherent I/O transaction returns from the second bus 116, the at least one forwarding device 150 may complete the first coherent I/O transaction by instructing the forwarding device processor 110 to allow the first coherent I/O transaction to access the first memory address in the forwarding device memory 112. After the first coherent I/O transaction is completed, the at least one forwarding device 150 may release and/or complete the remaining processor-issued transactions having the memory address conflict with the first coherent I/O transaction.

Figure 2:
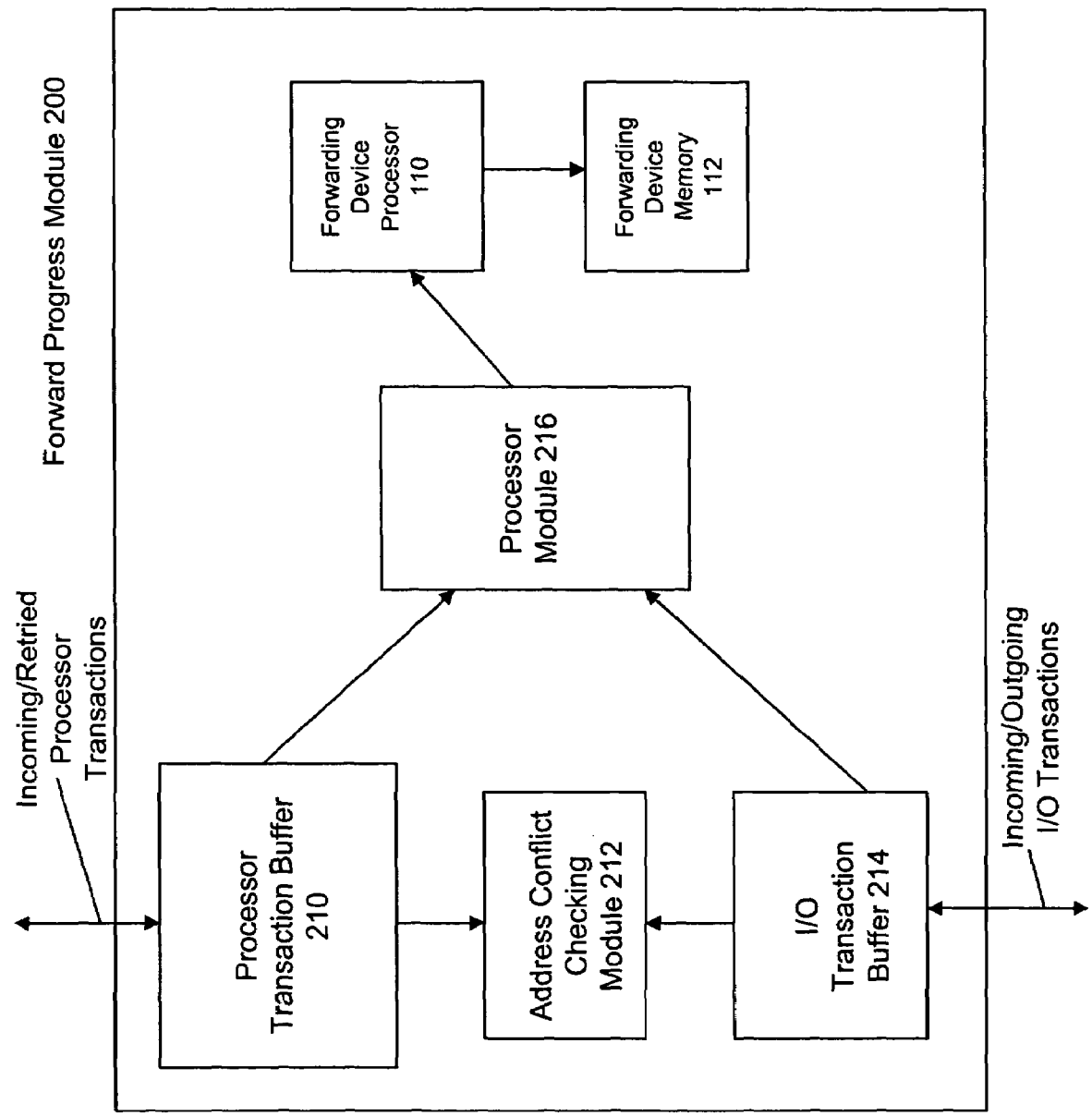
FIG. 2 illustrates a forward progress module in a forwarding device according to an embodiment of the present invention.

FIG. 2 illustrates a forward progress module in a forwarding device according to an embodiment of the present invention. The forward progress module 200 may include a processor transaction buffer 210, an address conflict checking module 212, an I/O transaction buffer 214, a processor module 216, a forwarding device processor 110, and a forwarding device memory 112. In an alternative embodiment, the forward progress module 220 may include a processor transaction buffer 210, an address checking module 212, and an I/O transaction buffer 214. In this embodiment, the processor module 216, the forwarding device processor 110, and the forwarding device memory 112 may be located external to the forward progress module 200. In one embodiment of the present invention, the forward progress module 200 may be located in a scalability controller device, such as an Intel™ Scalability Node Controller. In another embodiment of the present invention, the forward progress module 200 may be located in a switching device, such as an Intel™ Scalability Port Switch. Alternatively, the forward progress module 200 may be located in an I/O device 108, such as an Intel™ Server Input/Output Hub.

In an embodiment of the present invention, the processor transaction buffer 210 in the forward progress module 200 may receive at least one processor-issued transaction from at least one processor (not shown). In an embodiment of the invention, at least one processor-issued transaction may be received by a forward progress module 200. The at least one processor-issued transactions may be requesting access to at least one memory address, with each of the at least one processor-issued transaction requesting access to one of the at least one memory addresses. The I/O transaction buffer 214 may also receive a coherent I/O transaction from a plurality of I/O devices (not shown). The coherent I/O transaction may be requesting access to a first memory address.

The address conflict checking module 212 in the forward progress module 200 may compare the first memory address of the first coherent I/O transaction with the at least one memory addresses corresponding to the at least one processor-issued transaction. The address conflict checking module 212 may identify if an address conflict exists between the first memory address of the first coherent I/O transaction and at least one memory address of the at least one processor-issued transaction.

If the address conflict exists between the first memory address and the at least one memory address corresponding to the at least one processor-issued transaction, a first processor-issued transaction, which has the address conflict with the first memory address of the first coherent I/O transaction, may be completed by the processor module 216. The processor module 216 may complete the first processor-issued transaction by instructing the processor 110 to allow the first processor-issued transaction to access the corresponding memory address in the forwarding device memory 112. The first processor-issued transaction may be the first processor-issued transaction with the address conflict that entered the processor transaction buffer 210, e.g., a first-in, first-out structure. In another embodiment of the present invention, the first processor-issued transaction may be the processor-issued transaction with the address conflict that has the highest priority in terms of being executed. In another embodiment, the first processor-issued transaction may be the last processor-issued transaction with the address conflict that entered the processor transaction buffer 210, e.g., a first-in, first-out structure.

If there is an address conflict between the first memory address of the first coherent I/O transaction and at least one memory address corresponding to the at least one processor-issued transaction, the first coherent I/O transaction may be rejected and transmitted to the I/O device (not shown) via the I/O transaction buffer 214 and a second bus (not shown). In embodiments of the invention, any processor-issued transaction resident in the processor transaction buffer 210 may be processed and completed in a normal fashion if the address conflict does not exist with the first memory address of the first coherent I/O transaction. Additionally, a second address in a second coherent I/O transaction may be compared to at least one memory address corresponding to the at least one processor-issued transactions in the processor transaction buffer 210; and if no memory address conflict is present with the at least one processor-issued transactions, the second coherent I/O transaction may be completed by the processor module 216.

In embodiments of the present invention, more than one of the at least one processor issued transactions stored in the processor transaction buffer 210 may have the address conflict with the first memory address of the first coherent I/O transaction. If the address conflict exists between the first memory address of the first coherent I/O transaction and at least one memory address corresponding to the at least one processor-issued transactions, the forward progress module 200 may hold remaining processor-issued transactions, but not the first processor-issued transaction, of the at least one processor-issued transactions that request the first memory address in the processor transaction buffer 210. The forward progress module 200 may hold the remaining processor-issued transactions that request the first memory address to allow the first coherent I/O transaction to be completed at a future time.

In embodiments where more than one of the at least one processor-issued transactions have the address conflict with the first memory address, the forward progress module 200 may 1) send one of the processor-issued transactions, e.g., the first processor-issued transaction, to the processor module 216 for completion, 2) may reject the remaining processor issued transactions of the at least one processor-issued transactions, and may transmit the remaining processor-issued transactions, but not the first processor-issued transaction, of the at least one processor-issued transactions with the address conflict to the processor bus (not shown). The remaining processor-issued transactions may be resent to the forward progress module 200 of forwarding device 150 by the processor bus.

In one embodiment of the present invention, the processor transaction buffer 210 may only allow a single processor-issued transaction of the remaining processor-issued transaction that request the first address to be resident in the processor transaction buffer 210 at a specified period of time. In an alternative embodiment of the present invention, the forward progress module 200 may send the first processor-issued transaction to the processing module 216 for completion and may store the remaining processor-issued transactions of the at least one processor-issued transaction with the address conflict in the processor transaction buffer 210.

The forward progress module 200 of the scalability device 106 may wait for the first coherent I/O transaction to return from the second bus. In one embodiment of the present invention, the forwarding device 150 may wait for a specified period of time. In another embodiment of the present invention, the forwarding device 150 may wait until the first coherent I/O transaction returns, no matter how long the first coherent I/O transaction may take to return. In an embodiment of the present invention, the first coherent I/O transaction may return to the I/O transaction buffer 214. In this embodiment of the present invention, when the first coherent I/O transaction is the next transaction to be processed in the I/O transaction buffer 214, the forward progress module 200 of the forwarding device 106 may complete the first coherent I/O transaction. As discussed previously, completing the first coherent I/O transaction means that the processing module 216 instructs the forwarding device processor 110 to allow the first coherent I/O transaction to access the first memory address in the forwarding device memory 112. Once the first coherent I/O transaction is completed, the first coherent I/O transaction may be released from the I/O transaction buffer 214.

After the first coherent I/O transaction has been completed, any of the remaining processor-issued transactions being held by the forward progress module 200 of the forwarding device 150 may be released. In an embodiment of the present invention where the single processor-issued transaction is being held by the forward progress module 200 in the processor transaction buffer 210 and the remaining processor-issued transactions were sent to the processor bus, the forward progress module 200 may release the hold on the single processor-issued transaction and allow the processing module 216 to complete the single processor-issued transaction. Once the single processor-issued transaction is completed, the single processor-issued transaction may be released from the processor transaction buffer 210.

In embodiments of the invention where multiple remaining processor-issued transactions with the address conflict are being held by the forward progress module 200 in the processor transaction buffer 210, the forward progress module 200 may release the hold on the remaining processor-issued transaction of the at least one processor-issued transaction with the address conflict. The processing module 216 may complete the multiple remaining processor-issued transactions in any order. The multiple remaining processor-issued transactions may be completed in a first-in first-out (FIFO) manner, a last-in first out (LIFO) manner, or based on a priority assigned to them by the processor of the plurality of processors that initiated the processor-issued transaction. After the processing module 216 has completed the multiple processor-issued transactions, the other processor-issued transactions may be released from the processor transaction buffer 210

In embodiments of the invention where (1) multiple processor-issued transactions had an address conflict with the first memory address of the first coherent I/O transaction, (2) the first processor-issued transaction was completed, (3) a single processor-issued transaction of the remaining processor-issued transaction was held in the processor transaction buffer 210, and (4) the remaining processor-issued transactions were transmitted back to the processor bus (not shown), the forward progress module 200 may complete the single processor-issued transactions being held in the processor transaction buffer 210. Additionally, the forward progress module 200 may wait for the remaining processor-issued transactions to be transmitted back from the processor bus and may complete the remaining processor-issued transactions once they return form the processor bus. In this embodiment of the present invention, the other processor-issued transactions may be transmitted from the processor bus to the processor transaction buffer 210.

Figure 3:
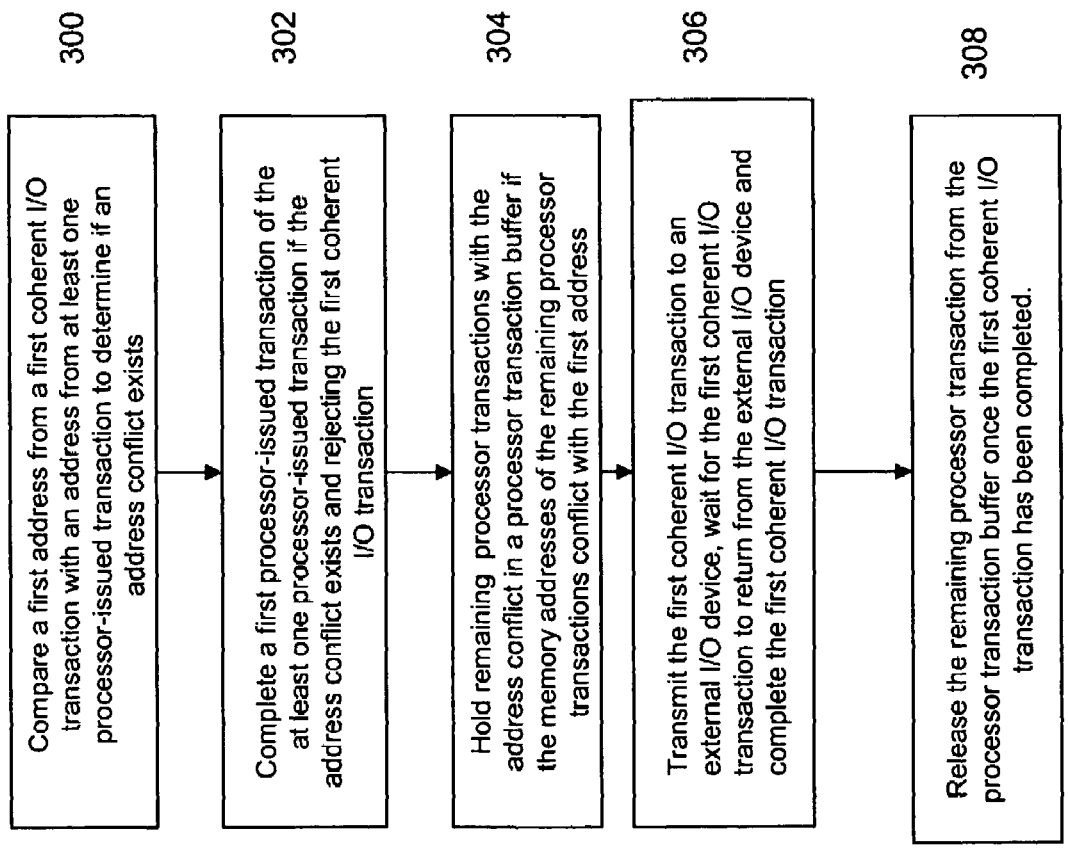
FIG. 3 illustrates a flowchart of a forward progress module to guarantee forward progress for coherent I/O transactions according to an embodiment of the present invention.

FIG. 3 illustrates a flowchart of a forward progress module to guarantee forward progress for coherent I/O transactions according to an embodiment of the present invention. The forward progress module compares 300 a first address from a first coherent I/O transaction with an address from at least one processor-issued transaction to determine if an address conflict exists. If the address conflict exists, a first processor-issued transaction of the at least one processor-issued transactions is completed 302 and the coherent I/O transaction is rejected. The forward progress module holds 304 other processor-issued transactions in a processor transaction buffer if the new memory address of the other processor-issued transaction conflicts with the first memory address of the coherent I/O transaction. The forward progress module transmits 306 the first coherent I/O transaction to an external I/O device, waits for the first coherent I/O transaction to return from the external I/O device, and completes the first coherent I/O transaction. The forward progress module releases 308 the hold on the other processor-issued transaction in the processor transaction buffer with the address conflict once the first coherent I/O transaction has been completed.

While the description above refers to particular embodiments of the present invention, it should be readily apparent to people of ordinary skill in the art that a number of modifications may be made without departing from the spirit thereof. The accompanying claims are intended to cover such modifications as would fall within the true spirit and scope of the invention. The presently disclosed embodiments are, therefore, to be considered in all respects as illustrative and not restrictive, the scope of the invention being indicated by the appended claims rather than the foregoing description. All changes that come within the meaning of and range of equivalency of the claims are intended to be embraced therein.

What is claimed is:

1. A forward progress module, comprising:
   an address conflict checking module to compare a first memory address from a first coherent input/output (I/O) transaction with a memory address corresponding to a processor-issued transaction to determine if an address conflict exists; and
   a processor module to complete the processor-issued transaction that has the address conflict, reject the first coherent I/O transaction, hold remaining processor-issued transactions other than the processor-issued transaction that have the address conflict with the first memory address, and transmit the rejected first coherent I/O transaction to an external I/O device due to the address conflict.

2. The forward progress module of claim 1, wherein the processor module waits for the rejected first coherent I/O transaction to return from the external I/O device, and completes the rejected first coherent I/O transaction once it returns.

3. The forward progress module of claim 2, wherein the processor module releases the remaining processor transactions once the rejected first coherent I/O transaction has been completed and allows the remaining processor transactions to be completed by the processor module.

4. The forward progress module of claim 1, wherein the forward progress module is located in a switching device.

5. The forward progress module of claim 1, wherein the forward progress module is located in an input/output (I/O) device.

6. The forward progress module of claim 1, further including a processor transaction buffer to store the at least one processor-issued transaction.

7. The forward progress module of claim 6, wherein the processor transaction buffer stores a single processor-issued transaction of the remaining processor-issued transactions that request the first memory address.

8. The forward progress module of claim 6, wherein the processor transaction buffer stores multiple processor-issued transactions of the remaining processor-issued transaction that request the first memory address.

9. The forward progress module of claim 1, wherein the remaining processor-issued transactions are transmitted to a processor bus.

10. The forward progress module of claim 1, further including a buffer module to store the first coherent I/O transaction.

11. A method to forward transactions, comprising:
comparing a first address from a first coherent input/output (I/O) transaction with an address from a processor-issued transaction to determine if an address conflict exists;
completing the processor-issued transaction if the address conflict exists and rejecting the first coherent I/O transaction;
holding remaining processor transactions that have the address conflict with the first address of the first coherent I/O transaction; and
transmitting the rejected first coherent I/O transaction, after the first coherent I/O transaction is rejected, to an external I/O device due to the address conflict.

12. The method of claim 11, further including waiting for the rejected first coherent I/O transaction to return from the external I/O device, and completing the rejected first coherent I/O transaction.

13. The method of claim 12, further including releasing the remaining processor transactions once the rejected first coherent I/O transaction has been completed and allowing the remaining processor transactions to be completed by a processor.

14. The method of claim 12, wherein an I/O transaction buffer stores the first coherent I/O transaction, transmits the rejected first coherent I/O transaction to the external I/O device, waits for the rejected first coherent I/O transaction to return from the external I/O device, and transmits the rejected first coherent I/O transaction to a processor module to complete the rejected first coherent I/O transaction.

15. The method of claim 11, wherein a single processor-issued transaction of the remaining processor transactions of the at least one processor transaction is held in a processor transaction buffer.

16. The method of claim 15, wherein a plurality of the remaining processor transactions are transmitted to a processor bus.

17. A program code storage device, comprising:
a machine-readable storage medium; and
machine-readable program code, stored on the machine-readable storage medium, the machine readable program code having instructions, which when executed cause a computer, to:
compare a first address from a first coherent input/output (I/O) transaction with an address from a processor-issued transaction to determine if an address conflict exists;
complete the processor-issued transaction if the address conflict exists and reject the first coherent I/O transaction;
hold remaining processor transactions that have the address conflict with the first address of the first coherent I/O transaction; and
transmit the rejected first coherent I/O transaction to an external I/O device due to the address conflict.

18. The program code storage device of claim 17, further including instructions, which when executed cause the computer to wait for the rejected first coherent I/O transaction return from the external I/O device and to complete the rejected first coherent I/O transaction.

19. The program code storage device of claim 18, further including instructions, which when executed cause the computer to release the remaining processor transactions once the rejected first coherent I/O transaction has been completed and to complete, utilizing a processor, the remaining processor transactions.

20. The program code storage device of claim 17, further including instructions, which when executed, cause the computer to hold a single processor-issued transaction of the remaining processor transactions in a processor transaction buffer and to transmit a plurality of the remaining processor transactions to a processor bus.

* * * * *